United States Patent Office 3,418,371
Patented Dec. 24, 1968

3,418,371
PROCESS FOR PREPARING AMINO-
DIPHENYL-ALKANES
Heinrich Krimm and Heinrich Ruppert, Krefeld-Bockum, and Hermann Schnell, Krefeld-Uerdingen, Germany, assignors to Farbenfabriken Bayer, Aktiengesellschaft, Leverkusen, Germany, a corporation of Germany
No Drawing. Continuation of application Ser. No. 377,080, June 22, 1964. This application Aug. 15, 1967, Ser. No. 668,275
Claims priority, application Germany, Mar. 4, 1963, F 40,154
8 Claims. (Cl. 260—570)

ABSTRACT OF THE DISCLOSURE

A process for preparing di-substituted diphenyl alkanes by reacting the corresponding dihydroxy-diphenyl alkane with a stoichiometric amount of an aromatic amine, inclusive of N-substituted amines, at a temperature of about 120–240° C.

---

The present invention is a continuation application of U.S. Ser. No. 337,080 and relates to a process for the production of methane derivative.

We have found that by the reaction of di-(hydroxyphenyl)-methane derivatives with aromatic amines, the hydroxyphenyl residues of these methane derivatives can be exchanged for aminophenyl residues so that there result (hydroxyphenyl) - (aminophenyl) - methane or di-(aminophenyl)-methane derivatives of the formula

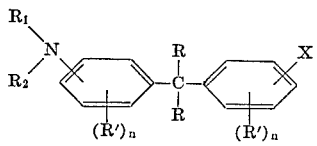

wherein $n$ is an integer of 0–2;
X is hydroxyl or

R is defined as a hydrogen atom, aliphatic such as lower alkyl or aromatic such as lower alkyl aryl, aralkyl or phenyl or

in combination is cycloaliphatic such as cycloalkyl having up to 6 carbon atoms in the ring;
$R_1$ and $R_2$ are individually defined as hydrogen or lower alkyl;
R' is an alkyl of 1–10 carbon atoms, phenyl, methoxy, ethoxy or chloro radical, R' being substituted in the phenyl ring in the 2,3, 2,5 or 2,6 positions when $n$ is 2.

The reactions can be illustrated by the following equation:

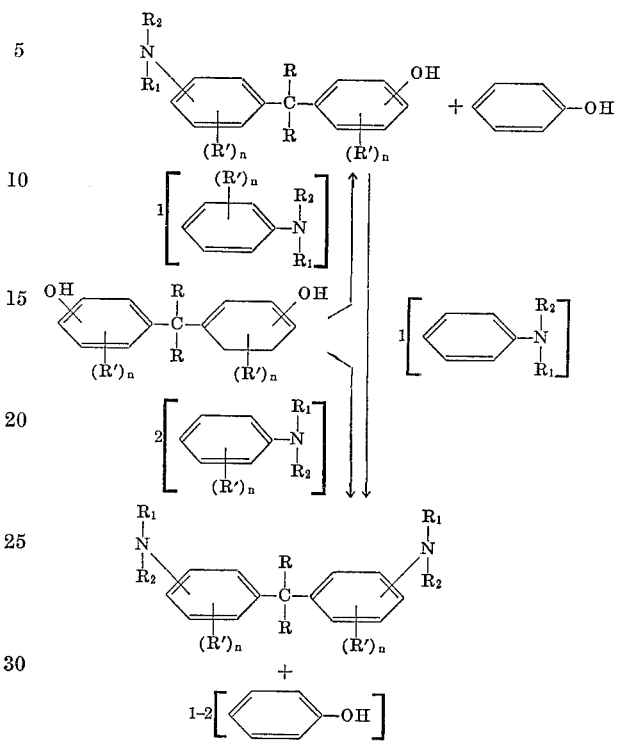

(Hydroxy phenyl)-(aminophenyl)-alkanes can, in fact, also be produced by the addition of anilines on alkenyl-phenols according to the process of co-pending application Ser. No. 295,203, filed July 15, 1963, now U.S. Patent No. 3,311,660.

The alkenyl-phenols necessary for this purpose are advantageously obtained by the fission of the corresponding di-(hydroxyphenyl)-alkanes using alkaline catalysts, especially according to the process of co-pending application Ser. No. 296,935, filed July 23, 1963, and now abandoned.

On the other hand, apart from the readily obtainable di - (4 - aminophenyl)-methane, the di-(aminophenyl)-alkanes derived from ketones, e.g. 2,2-di-(4-aminophenyl)-propane, are obtainable in only poor yields, from ketones and aniline by laborious processes, for example, in the presence of hydrochloric acid in an autoclave at 150° C. Di-(aminophenyl)-alkanes are obtainable more advantageously by the addition of anilines to alkenyl-anilines in the presence of acidic catalysts, the alkenyl-anilines being expediently produced by the fission of (aminophenol)-(hydroxyphenyl)-alkanes using alkaline catalysts, according to the process of co-pending application Ser. No. 368,978, filed May 20, 1964, and now U.S. Patent No. 3,359,317.

According to the process of the present invention, it is not necessary for the production of (hydroxyphenyl)-(aminophenyl)-methane derivatives and of di-(aminophenyl)-methane derivatives to start from alkenyl-phenols or alkenyl-anilines, the production of which, as described above, most expediently starts from the corresponding di- (hydroxyphenyl)-methane derivatives, but it is now possible to exchange directly the hydroxyphenyl radicals in di-(hydroxyphenyl)-alkane derivatives for aminophenyl radicals According to the reaction conditions used it is possible to shift the ratio of the two reaction products in favour of one or the other, Thus, with short reaction times and with the use of stoichiometric or slightly more than stoichiometric amounts of aromatic amine, the (hydroxyphenly)-(aminophenyl)-methane derivatives are obtained almost exclusively.

By the use of a considerable excess of aromatic amine, by longer reaction times, higher reaction temperatures, and by the removal of the phenolic component from the equilibrium by distilling it off, it is possible to produce the di-(aminophenyl)-methane derivative in considerable amounts, besides the (hydroxyphenyl)-(aminophenyl)-methane derivative.

However, there are limits for the complete exchange of the hydroxy-phenyl groups because, as a result of the more severe reaction conditions or longer reaction times necessary for this purpose, yield-reducing side reactions become more and more apparent. Consequently, if it is desired to produce di-(aminophenyl)-methane derivatives, it will be expedient not to work towards complete reaction, especially since the (hydroxyphenyl) - (aminophenyl)-methane derivatives obtained as by-products can be used again in a new batch.

Although the present invention is limited to the exchange of hydroxy-phenyl groups for amino-phenyl-groups only it should be pointed out that the reverse exchange is also possible, for example, the conversion of di-aminophenyl)-propane into (hydroxyphenyl)-(aminophenyl)-propane by reaction with phenol. The possibilities accruing therefrom for the production of products in the reverse manner to that of the above-given equations were only intended to be indicated and do not come within the ambit of present invention.

Di-(hydroxyphenly) - methane derivatives which are suitable for the process are, for example:

4,4'-dihydroxy-diphenyl-methane,
1,1-(4,4'-dihydroxy-diphenyl)-ethane,
1,1-(4,4'-dihydroxy-diphenyl)-propane,
1,1-(4,4'-dihydroxy-diphenyl)-butane,
1,1-(4,4'-dihydroxy-diphenyl)-2-methyl-propane,
1,1-(4,4'-dihydroxy-diphenyl)-heptane,
1,1-(4,4'-dihydroxy-diphenyl)-1-phenyl-methane,
(4,4'-dihydroxy-diphenyl)-(4-methyl-phenyl)-methane,
(4,4'-dihydroxy-diphenyl)-(4-ethyl-phenyl)-methane,
(4,4'-dihydroxy-diphenyl)-(4-isopropyl-phenyl)-methane,
(4,4'-dihydroxy-diphenyl)-(4-butyl-phenyl)-methane,
(4,4'-dihydroxy-diphenyl)-benzyl-methane,
(4,4'-dihydroxy-diphenyl)-α-furyl-methane,
2,2-(4,4'-dihydroxy-diphenyl)-propane,
2,2-(4,4'-dihydroxy-diphenyl)-butane,
2,2-(4,4'-dihydroxy-diphenyl)-pentane,
2,2-(4,4'-dihydroxy-diphenyl)-4-methyl-pentane,
2,2(4,4'-dihydroxy-diphenyl)-heptane,
2,2-(4,4'-dihydroxy-diphenyl)-octane,
2,2-(4,4'-dihydroxy-diphenyl)-nonane,
1,1-(4,4'-dihydroxy-diphenyl)-1-phenyl-ethane,
(4,4'-dihydroxy-diphenyl)-1-(α-furyl)-ethane,
3,3-(4,4'-dihydroxy-diphenyl)-pentane,
4,4-(4,4'-dihydroxy-diphenyl)-heptane,
1,1-(4,4'-dihydroxy-diphenyl)-cyclopentane,
1,1-(4,4'-dihydroxy-diphenyl)-cyclohexane,
2,2-(4,4'-dihydroxy-diphenyl)-decahydronaphthalene,
2,2-(4,4'-dihydroxy-3,3'-dicyclohexyl-diphenyl)-propane,
2,2-(4,4'-dihydroxy-3-methyl-diphenyl)-propane,
2,2-(4,4'-dihydroxy-3-isopropyl-diphenyl)-butane,
1,1-(4,4'-dihydroxy-3,3'-dimethyl-diphenyl)-cyclohexane,
2,2-(4,4'-dihydroxy-3,3'-dibutyl-diphenyl)-propane,
2,2-(4,4'-dihydroxy-3,3'-diphenyl-diphenyl)propane,
2,2-(4,4'-dihydroxy-2,2'-dimethyl-diphenyl)-propane,
1,1-(4,4'-dihydroxy-3,3'-dimethyl-6,6'-dibutyl-diphenyl)-butane,
1,1-(4,4'-dihydroxy-3,3'-dimethyl-6,6'-di-tert.butyl-diphenyl)-ethane,
1,1-(4,4'-dihydroxy-3,3'-dimethyl-6,6'-di-tert.butyl-diphenyl)-propane,
1,1-(4,4'-dihydroxy-3,3'-dimethyl-6,6'-di-tert.butyl-diphenyl)-butane,
1,1-(4,4'-dihydroxy-3,3'-dimethyl-6,6'-di-tert.butyl-diphenyl)-isobutane,
1,1-(4,4'-dihydroxy-3,3'-dimethyl-6,6'-di-tert.butyl-diphenyl)-heptane,
1,1-(4,4'-dihydroxy-3,3'-dimethyl-6,6'-di-tert.butyl-diphenyl)-1-phenyl-methane,
1,1-(4,4'-dihydroxy-3,3'-dimethyl-6,6'-di-tert.butyl-diphenyl)-2-methyl-2-pentane
1,1-(4,4'-dihydroxy-3,3'-dimethyl-6,6'-di-tert.butyl-diphenyl)-2-ethyl-2-hexane, and
1,1-(4,4'-dihydroxy-3,3'-dimethyl-6,6'-di-tert.amyl-diphenyl)-butane.

Aromatic amines within the meaning of the present invention are, for example, aniline, o-,m- and p-toluidine, o-,m- and p-ethyl, propyl, butyl, isobutyl, amyl, hexyl, heptyl, octyl, nonyl and decyl anilines, 2,3-, 2,5 and 2,6-xylidine, 2-methyl-3-ethylaniline, 2-methyl-5-ethyl aniline, 2-methyl-6-ethyl aniline, 2,3-, 2,5 and 2,6-diethyl aniline and so on, methoxy and ethoxy anilines, chloroanilines, N-methyl,-ethyl,-propyl and -butyl aniline, N,N-dimethyl,-diethyl,-dipropyl and-dibutyl aniline, N-methyl-N-ethyl aniline, N-methyl-N-propyl aniline, N-methyl-N-butyl aniline and so on.

Although the exchange reaction according to the present invention can be achieved without the use of catalysts, as well as with the use of alkaline or acidic catalysts, it is, in general, preferred to use acidic catalysts. The acids are expediently introduced in the form of salts of the anilines, preferably of the hydrohalides, but also, for example, of sulphates, p-toluene-sulphonates and phosphates. Furthermore, it is also possible to potentiate the acid action, for example, by the introduction of hydrogen halides or boron trifluoride during the reaction.

In general, the reaction temperature is 120–240° C., preferably 150–200° C. For the removal of the phenolic component, it is expedient to apply reduced pressures, for example, of about 10–200 mm. Hg.

The reaction products, the (hydroxyphenyl)-(aminophenyl)-methane derivatives and the di-(aminophenyl)-methane derivatives, which are generally obtained together, although in varying proportions, are worked up by recrystallization or distillation or, especially expediently, by shaking out with a sodium hydroxide solution in which only the (hydroxyphenyl)-(aminophenyl)-methane derivatives dissolve.

The products according to the present process can be used as anti-ageing agents, for instance, for natural and synthetic rubbers, polyethylene, polyamides and so on. Furthermore, the bis-(aminophenyl)-methane derivatives may be used as intermediates for the production of diisocyanates.

The following examples are given for the purpose of illustrating the present invention:

Example 1

A mixture of 228 g. (1 mol) 2,2-di-(4-hydroxy-phenyl)-propane and 465 g. (5 mol) aniline is heated at 250° C., for 3 hours in an autoclave. The excess aniline and the phenol formed during the reaction are distilled off in a vacuum. The solution of the residue in sodium hydroxide solution is shaken out with toluene. From the toluene solution there are obtained, by distillation at 160–180° C./0.1 mm. Hg, 9.5 g. (4.2% of theory) 2,2-di-(4-amino-phenyl)-propane.

From the alkaline solution, there can be obtained, by acidification with dilute hydrochloric acid, shaking out with toluene and neutralization with a sodium carbonate solution, 35 g. (15.5% of theory) 2-(4-hydroxyphenyl)-2-(4-aminophenyl)-propane.

Example 2

A melt of 228 g. (1 mol) 2,2-di-(4-hydroxyphenyl)-propane and 520 g. (4 mol) aniline hydrochloride is heated at 180° C., for 30 minutes, while passing over nitrogen. The reaction product is diluted with water to give a clear solution. This is rendered strongly alkaline with a dilute sodium hydroxide solution and shaken out with toluene. The toluene layer is dried over anhydrous sodium sulphate and distilled. After distilling off the unreacted aniline, 14 g. 2,2-di-(4-aminophenyl)-propane distil over at 162–165° C./0.03 mm. Hg Melting point: 132° C. (from cyclohexane).

The aqueous solution is neutralized with concentrated hydrochloric acid. The precipitated crystals are filtered off with suction. There are obtained 206 g. 2-(4-hydroxyphenyl)-2-(4-aminophenyl)-propane of melting point 186–188° C. Yield: 91% of theory.

Example 3

A melt of 228 g. (1 mol) 2,2-di-(4-hydroxyphenyl)-propane and 260 g. (2 mol) aniline hydrochloride is heated at 150° C., for 2 hours, while passing over nitrogen. The reaction product is worked up as described in Example 2. In addition to 6 g. 2,2-di-(4-aminophenyl)-propane, 216 g. 2-(4-hydroxyphenyl)-2-(aminophenyl)-propane are obtained. Yield: 95% of theory.

Example 4

A melt of 228 g. (1 mol) 2,2-di-(4-hydroxyphenyl)-propane and 780 g. (6 mol) aniline hydrochloride is heated at 180° C., for 5 hours, while passing over nitrogen. The phenol split off is distilling off in a vacuum. The reaction product is worked up as described in Example 2. There are obtained 144 g. (63.5% of theory) 2-(4-hydroxyphenyl)-2-(4-aminophenyl)-propane and 76 g. (33.6% of theory) 2,2-di-(4-aminophenyl)-propane.

Example 5

A mixture of 227 g. (1 mol) 2-(4-hydroxyphenyl)-2-(4-aminophenyl)-propane, 465 g. (5 mol) aniline and 2.5 g. calcium hydroxide is heated under reflux for 2.5 hours. The unreacted aniline is distilled off in a vacuum. The residue is dissolved in a 2 N sodium hydroxide solution and shaken out with toluene. After drying with sodium sulphate and distilling off the solvent, 21 g. of crystals remain behind which consist of 2,2-di-(4-aminophenyl)-propane. By neutralization with concentrated hydrochloric acid, there are obtained, from the sodium hydroxide solution, 201 g. 2-(4-hydroxyphenyl)-2-(4-aminophenyl)-propane. Yield: 80% of theory, referred to the reacted starting material.

Example 6

A melt of 134 g. (0.5 mol) 1,1-di-(4-hydroxyphenyl)-cyclohexane and 260 g. (2 mol) aniline hydrochloride is heated at 180–190° C., for 3 hours, while passing over nitrogen, the phenol split off being distilled off at 130–160° C./150 mm. Hg. The residue is then dissolved in water, heated to 50° C., with an excess sodium hydroxide solution and shaken out with toluene. The toluene solution is dried over anhydrous sodium sulphate and distilled. After distilling off the unreacted aniline, at 210–215° C./0.09 mm Hg a fraction distils over which crystallizes, after trituration with toluene, and proves to be 1,1-di-(aminophenyl)-cyclohexane. Yield: 45 g. (34% of theory). Melting point 114° C., (recrystallized from toluene). From the sodium hydroxide solution there are obtained by neutralization with concentrated hydrochloric aicd, 65 g. 1-(4-hydroxyphenyl)-1-(4-aminophenyl)-cyclohexane. Melting point: 158 g. (recrysttllized from toluene). Yield: 48.5% of theory.

Example 7

A melt of 114 g. (0.5 mol) 2,2-di-(hydroxyphenyl)-propane and 287 g. (2 mol) o-toluidine hydrochloride is heated under nitrogen at 180–190° C., for 3 hours, while the phenol spilt off is distilled off at 135–160° C./150 mm. Hg. The residue is worked up as described in Example 6. From the toluene solution there are obtained, by distillation; 51 g. 2,2-di-(4-amino-3-methyl-phenyl)-propane of boiling point 185–190° C./0.1 mm. Hg. Yield: 40% of theory. The compound crystallizes upon trituration with water. The diamine, containing water of crystallization, melts at 75° C. By neutralization, there are obtained from the sodium hydroxide solution, 66 g. 2-(4-hydroxyphenyl) - 2 - (4-amino-3-methyl-phenyl)-propane. Melting point: 174° C., (recrystallized from toluene). Yield: 55% of theory.

Example 8

A melt of 114 g. (0.5 mol) 2,2-di-(4-hydroxyphenyl)-propane and 287 g. (2 mol) N-methyl-aniline hydrochloride is heated under nitrogen at 180° C., for 3 hours. The reaction product is dissolved in water, rendered strongly alkaline with a sodium hydroxide solution and shaken out with toluene. The toluene solution is dried over anhydrous sodium sulphate and distilled. After distilling off the N-methyl-aniline, 38 g. 2,2-di-(4-methylamino-phenyl)-propane distil over at 152–154° C./0.08 mm. Hg. Yield: 30% of theory. From the sodium hydroxide solution there precipitate, after neutralization with concentrated hydrochloric acid, 67 g. 2-(4-hydroxyphenyl)-2-(4-methylamino-phenyl)-propane. Melting point: 134° C., (recrystallized from toluene). Yield: 55% of theory.

Example 9

A melt of 227 g. (1 mol) 2-(4-hydroxyphenyl)-2-(4-amino-phenyl)-propane and 420 g. (4 mol) aniline hydrochloride is saturated with hydrogen chloride and heated to 180° C., for 5 hours, while slowly passing in hydrogen chloride. The phenol formed is distilled off in a vacuum and the residue worked up as described in Example 2. 115 g. 2,2-di(4-aminophenyl)-propane are obtained. 85 g. of the starting material are recovered. Yield: 81%, referred to the reacted material.

What is claimed is:

1. A process for producing diphenyl alkanes of the formula

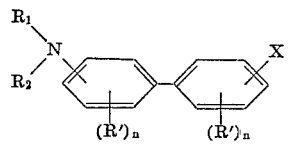

which comprises reacting a dihydroxy-diphenyl alkane reactant of the formula

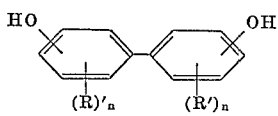

with at least a stoichiometric amount of an amine reactant of the formula

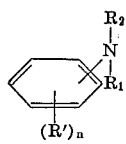

wherein
$n$ is 0–2;
X is hydroxyl or

R is defined as hydrogen, lower alkyl, lower alkyl aryl, aralkyl, phenyl or

in combination is defined as a cycloalkyl having up to 6 carbon atoms in the ring;

$R_1$ and $R_2$ are individually defined as hydrogen, lower alkyl;

R' is alkyl of 1–10 carbon atoms, phenyl, methoxy, ethoxy chloro;

R' being substituted in the phenyl moiety in the 2,3, 2,5 or 2,6 positions; effecting the reaction at a temperature of about 120–240° C. and recovering the resulting product.

2. The process of claim 1 wherein a (hydroxy-phenyl)-(amino-phenyl)-alkane product is recycled.

3. The process of claim 1 wherein the reaction is carried out in the presence of a catalytic amount of the hydrohalide, sulphate, p-toluene-sulphonate, or phosphate salts of the amine reactant.

4. The process of claim 1 wherein the reaction is carried out at a temperature of 150°–200° C.

5. The process of claim 1 wherein phenol products are removed at a pressure of about 10–200 mm. of mercury.

6. The process of claim 1 wherein hydroxy-group containing products are recovered by extracting with sodium hydroxide solution.

7. The process of claim 1 wherein the dihydroxy-diphenyl reactant is di(hydroxy-phenyl)-alkane.

8. The process of claim 1 wherein the diphenyl alkane is a di-(hydroxy-phenyl)-cycloalkane.

References Cited

UNITED STATES PATENTS 2,507,755   5/1950   Boyd _____ 260—578

CHARLES B. PARKER, *Primary Examiner.*

R. V. HINES, *Assistant Examiner.*

U.S. Cl. X.R.

252—401, 403; 260—49, 45.9, 347.7, 347.8, 390, 391, 393, 618, 627, 805, 808, 809